Patented Oct. 13, 1931

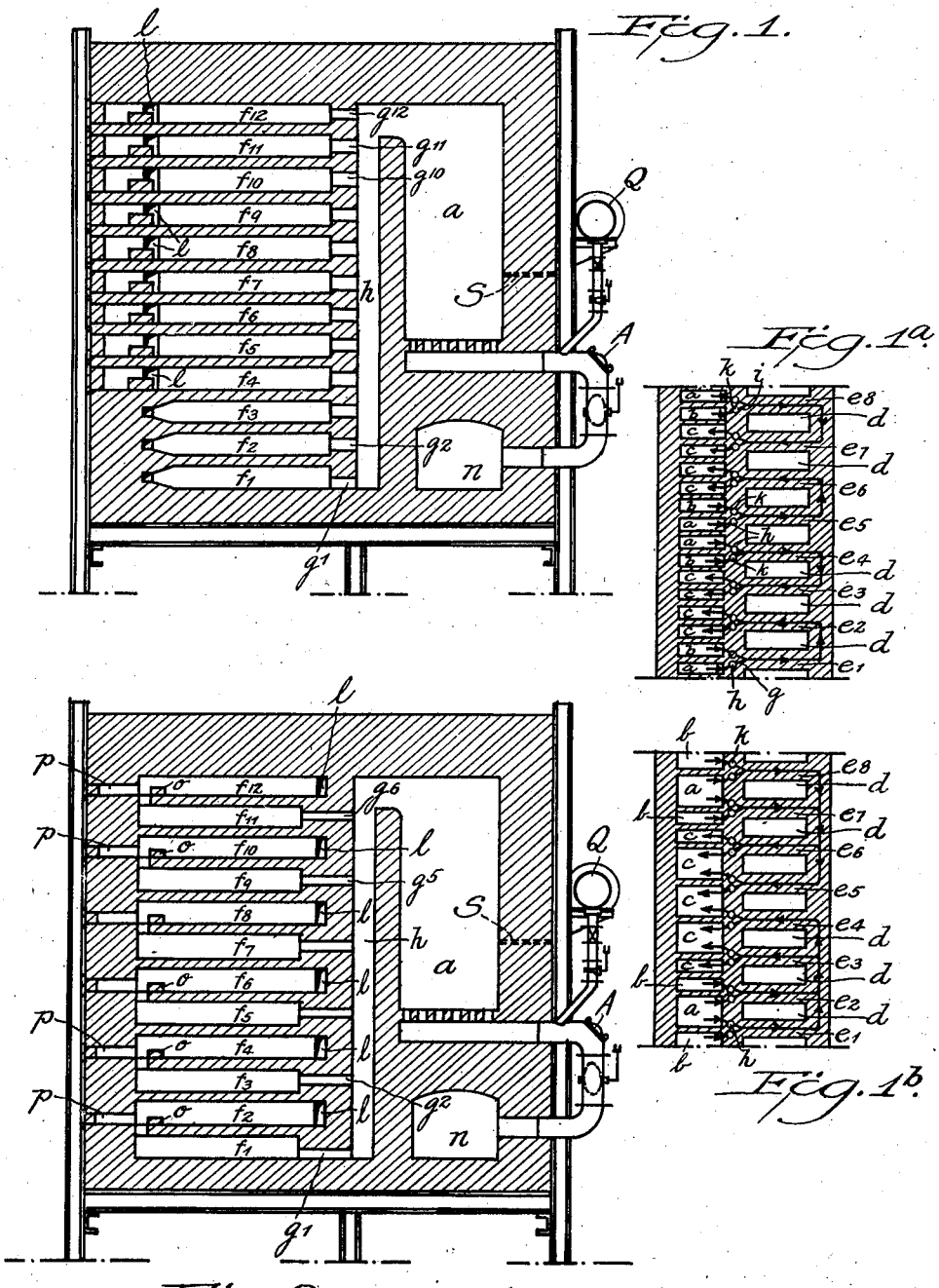

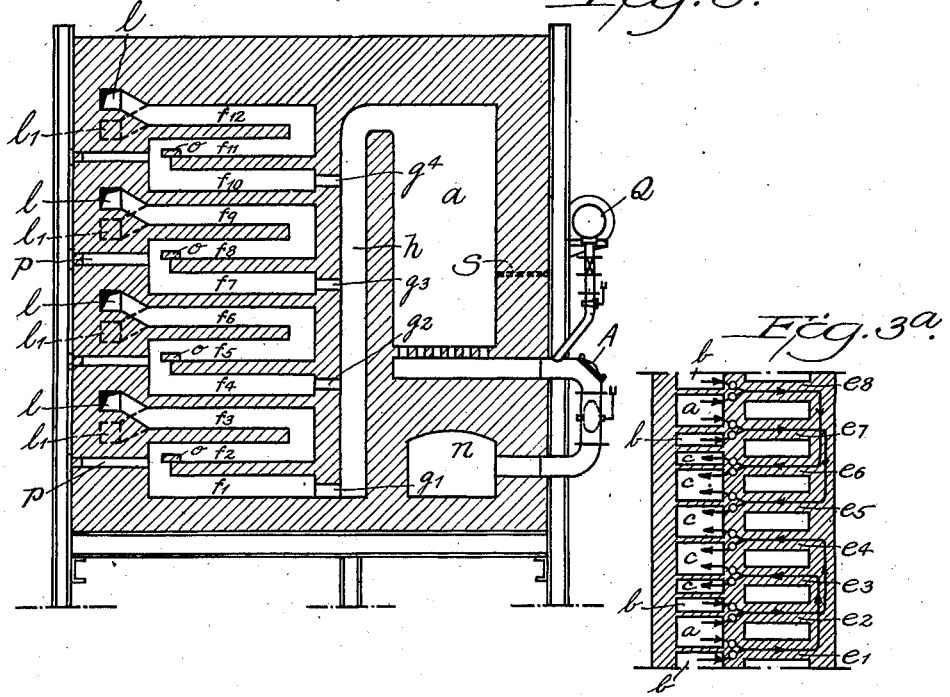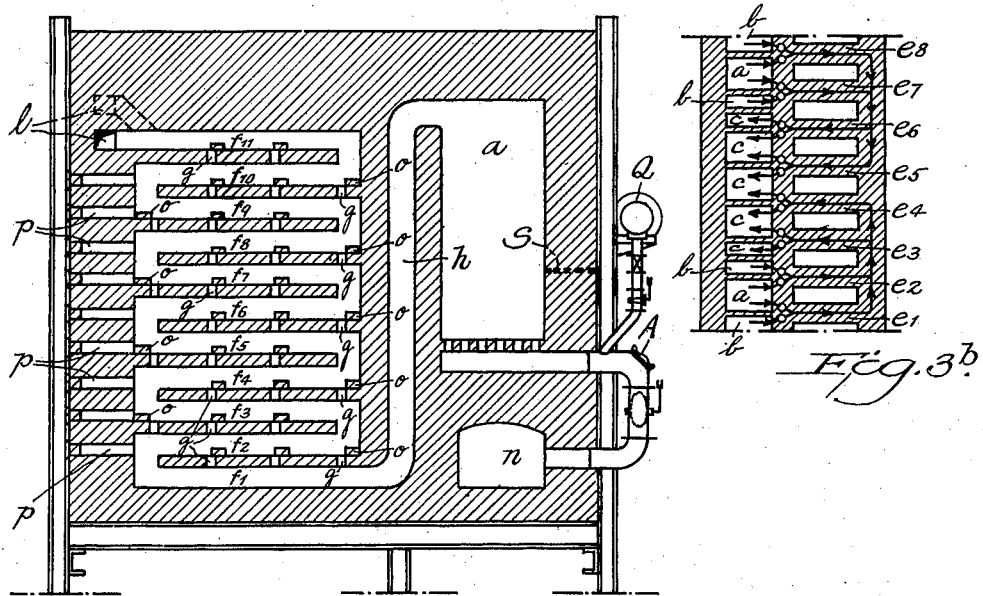

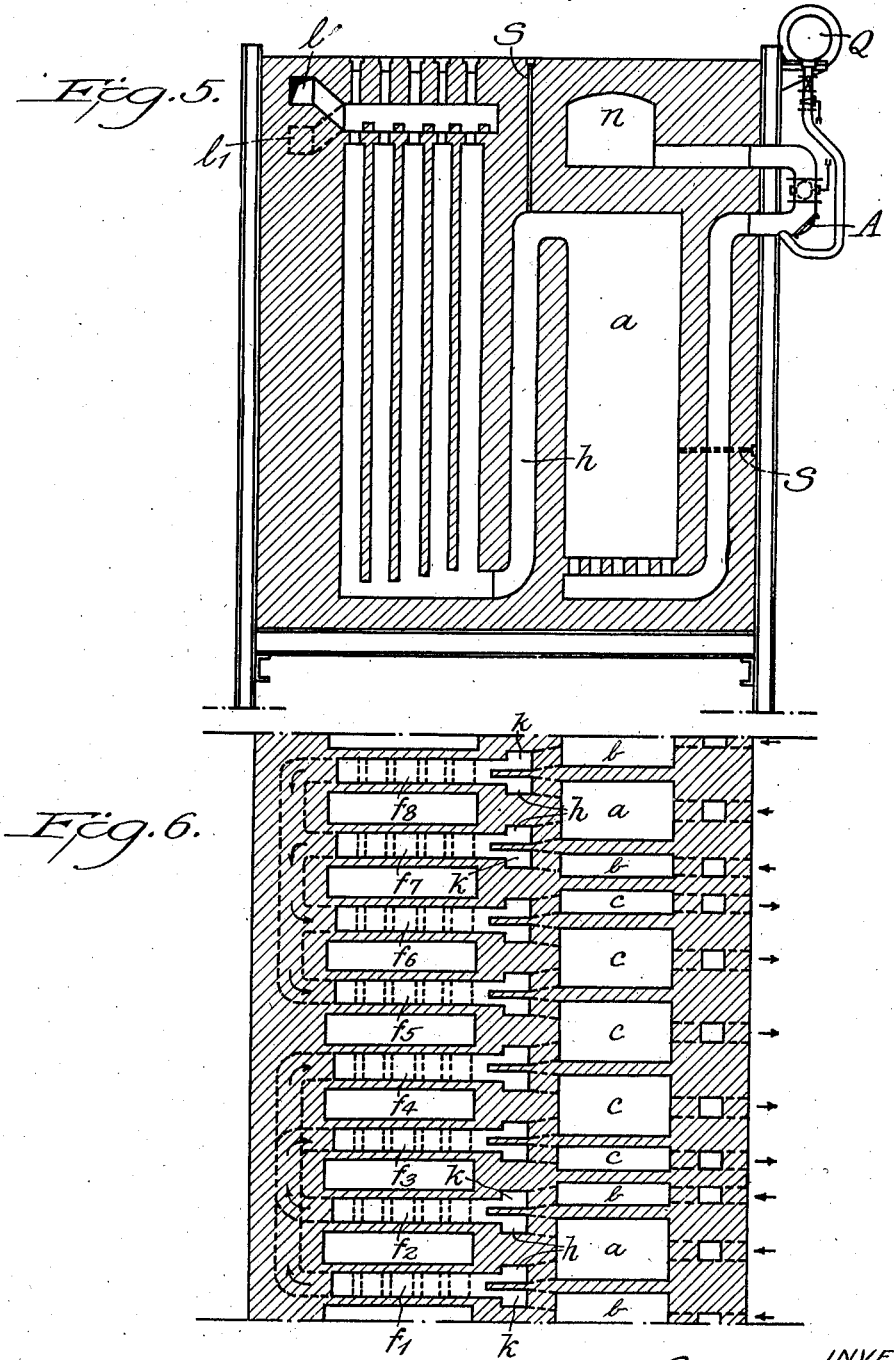

1,827,328

UNITED STATES PATENT OFFICE

CARL OTTO, OF HELLERUP, DENMARK

VERTICAL CHAMBER OVEN

Application filed December 7, 1925, Serial No. 73,610, and in Germany January 20, 1925.

This invention relates to vertical chamber ovens and particularly to such ovens having narrow and broad sides and provided with heating walls having horizontal or vertical heating flues and in which the regenerators are arranged in a vertical direction in front of one of the narrow sides only of the vertical oven chambers and in which several heating walls are connected into heating groups by means of horizontal cross-passages, which, in one form of the invention, are located in front of the other narrow side of the oven chambers.

Since these ovens are principally operated with weak gas, regenerators are provided for preheating weak gas and combustion air.

One of the objects of my invention is to provide a pair of vertical channels connected respectively with each air and gas preheater and with which one arm of each heating flue may be connected, the other ends of the heating flues of the several heating walls being cross-connected, thus shortening the flame length of the heating path and providing a more uniform heating of the wall.

In accordance with my invention, in ovens with the above characteristics, the hot preheated gases and the hot preheated combustion air, are each collected into a separate channel of a pair at the upper ends of the regenerators and the gases and the air are respectively fed downward by means of the vertical channels which lie between the regenerator chambers and the oven heating walls. The horizontal heating flues of the heating walls are connected with the vertical channels in several forms of the invention, at intervals. This same arrangement of horizontal heating flues and the air, gas and waste heat channels connected with them, is provided in a cross-connected heating wall or in several heating walls cross-connected together into several groups. In each group the air and gas regenerators are connected to an equal number of regenerators for receiving waste heat. For example, in one form of the invention illustrated, a pair of air and gas regenerators discharge into a pair of regenerators receiving waste heat, thus preserving a uniformity of flow of heat in the operation of the oven in both directions.

With the above and other objects in view, my invention consists in the parts, improvements and combinations more fully pointed out hereinafter.

Turning now to the drawings which illustrate several embodiments of the invention:

Figure 1 is a vertical cross-section of a vertical oven embodying one form of the invention, showing each arm of a flue connected to the vertical channel.

Figure 1a is a diagrammatic, cross-sectional detail view, showing the connection of the flues of adjacent heating walls, according to one form of the invention.

Figure 1b is a diagrammatic, cross-sectional detail, showing the connection of four heating walls into a group, according to another form of the invention.

Figure 2 is a vertical cross-section of a vertical oven embodying another form of the invention, in which each two armed flue is connected to the vertical channel.

Figure 3 is a vertical cross-section of a vertical oven embodying another form of the invention in which each three armed flue is connected to the vertical channel.

Figures 3a and 3b are diagrammatic sections showing two ways of connecting the flues of the heating walls.

Figure 4 is a vertical cross-section of a vertical oven, illustrating another form of the invention, in which the flues are connected at one end to the vertical channel, each separating flue wall being provided with valve openings.

Figure 5 is a vertical cross-section of a vertical oven, showing another form of the invention in which vertical flues are used with each heating wall; and Figure 6 is a horizontal cross-section of the form of oven shown in Figure 5.

In accordance with the invention several forms are provided, one of these forms being illustrated in Figure 1.

The gas regenerators "a" receiving weak gas from mains "Q", and the air regenerators "b", receiving air from air valves "A", lie next to each other in front of one of the narrow sides of the oven chamber and alternate with the waste heat regenerators "$c$". All the regenerators are thus located on the same narrow side only of the oven chamber. In Fig. 1a, the series of vertical oven chambers and the series of heating walls $e_1$, $e_2$, $e_3$, $e_4$, $e_5$, etc., lying between the oven chambers $d$, are of the same construction as in Figure 1. A number of horizontal heating flues $f_1$, $f_2$, $f_3$, $f_4$, etc. lying one above the other are connected by means of horizontal passages $g_1$, $g_2$, etc. with a vertical collecting channel "$h$" arranged between the gas regenerators "$a$" and the flues and by means of openings, are connected with a vertical collecting channel "$k$" similarly arranged in front of the air regenerators "$b$". One gas supply "$g$" and one air supply "$i$", thus discharge into each heating flue "$f$". The gases burn in the horizontal flue "$f$" toward the rear, pass by means of horizontal cross-channels "$l$", to the flue "$f$" of a neighboring heating wall connected thereto, pass thru another pair of openings "$g$" and "$i$" into the vertical collecting channels "$h$" and "$k$" of the said neighboring heating wall, and after passing through regenerators "$c$" now being used to receive waste heat, are fed into the waste heat channel "$n$" by means of pipe "$m$" from the connected regenerator "$c$". Upon reversal of the oven the direction of flow is reversed. According to the scheme shown in Figure 1a, the gases, for example, may burn in the wall $e_1$, $e_4$, $e_5$, $e_8$, toward the back and pass by means of the connected heating walls $e_2$, $e_3$, $e_6$, $e_7$, to the waste-heat regenerators lying at the same narrow side as the regenerators supplying air and gas.

According to Fig. 1b, groups of four heating walls are connected together, for example the flues in walls $e_1$ and $e_2$, with the flues in walls $e_3$ and $e_4$; walls $e_7$ and $e_8$, with walls $e_5$ and $e_6$, etc. By this arrangement two adjacent gas or, for example, air regenerators which have the same draft direction, are connected practically into one common regenerator space. The drawings, Fig. 1b, shows this very clearly in a diagrammatic way.

In the form of the invention shown in Figure 2, the general arrangement of the ovens and heating walls and their connection with the regenerators is the same as with the arrangement of Figure 1. There is a difference in the connection of the horizontal heating flues with each other and between these flues and the vertical distribution channels "$h$" and "$k$".

According to Figure 2, each two armed horizontal heating flue, $f_1$ and $f_2$, $f_3$ and $f_4$, $f_5$ and $f_6$, etc. is connected into a single heating pair and each heating pair of one wall is connected with a same positioned heating pair of a neighboring wall by means of a cross-connecting channel "$l$", which in this case is preferably arranged on the inner side of the heating flue. By means of slide valves "$o$", which are reached through openings "$p$", the heating of each double flue is controlled and regulated.

The form of the invention shown in Figure 3, departs from the forms shown in Figures 1 and 2, in that although the arrangement of the oven chambers, heating walls and regenerators remains the same, each three armed horizontal flue, for example, $f_1$, $f_2$ and $f_3$, $f_4$, $f_5$ and $f_6$, etc. is connected into a single heating system of which a heating system of one wall is connected with a similarly positioned heating system of the next heating wall or also of the wall beyond the next. Two similar heating systems of two walls can also be connected with two heating systems of two following walls. According to Figure 3a, for example, heating wall $e_1$ is connected with $e_3$, $e_2$, with $e_4$, $e_5$ with $e_7$ and $e_6$ with $e_8$, and according to Figure 3b, walls $e_1$ and $e_2$, are connected with walls $e_3$ and $e_4$; walls $e_5$ and $e_6$ with walls $e_7$ and $e_8$. In the arrangement of Figure 3a, the cross channels must cross each other. There are, therefore, provided in Figure 3, two channels $l$ and $l_1$, lying one above the other. As before the openings "$p$" through which the valves "$o$" are regulated, serve for regulating the heating gases for each heating group. In Figures 1, 2 and 3, respectively, the horizontal flues may be constructed with one arm, two arms or three arms for each flue and the vertical channel may be connected to an arm of any one of the three forms illustrated.

In the form shown in Figure 4, all of the horizontal heating flues $f_1$ to $f_{11}$ are connected in series and two regulating openings "$q$" are provided in the separating tongues, or division walls, between each two heating flues. This permits one part of the heating gases to pass through all the heating flues in series and another part to pass in a vertical direction through the openings "$g$".

The cross channels $l$ and $l_1$, running from one heating wall to another, are provided only at the upper heating flue $f_{11}$. The connection of the heating walls can take place in the same way as shown in the diagrammatic Figures 1a, 3a, and 3b.

A further development of the invention shown in Figure 4, provides an oven with vertical heating flues, illustrated in Figures 5 and 6. In these latter figures weak gas is supplied from the mains "Q" and air through valves "A". The vertical gas and air channels "$h$" and "$k$" pass from the upper ends of the regenerators "$a$" and "$b$" to the lower ends of the vertical heating flues and the upper collecting channel passes over the vertical heating flues and by means of a cross-channel $l$, $l_1$, is connected with a corresponding upper collecting channel of a neighboring wall thru the flues of which the flame passes, then out thru regenerators "$c$" and waste-heat channel "n". In the figures the direction of travel of the flow of the heating media is shown by arrows and can be understood without further explanation. In the connected heating wall the direction of flow is, naturally, the opposite.

The oven is provided with means for supplying strong gas at "S", in the various figures, if desired.

Having thus described the invention, and its construction and operation, it will be understood that changes may be made in carrying the invention into effect without departing from the principle thereof.

What I claim is:

1. In a vertical chamber oven the combination of a substantially horizontal series of alternate vertical oven chambers, and heating walls therefor each of said heating walls having horizontal heating flues therein, regenerators for supplying air and gas to the flues and adapted to receive waste heat therefrom, said regenerators arranged side by side and extending in a vertical direction at one side only of the oven chambers, pairs of vertical channels, one end of the members of each pair of which connect with one end of the gas and with one end of the air regenerators respectively, the heating flues of the heating walls being connected with said vertical channels, thus connecting the heating flues with the regenerators, and horizontal cross-channels connecting the heating flues of a plurality of heating walls, so that the regenerators for supplying air and gas are connected with an equal number of regenerators for receiving waste heat.

2. In a vertical chamber oven, the combination of a substantially horizontal series of alternate vertical narrow and broad sided oven chambers, and heating walls therefor, each of said heating walls having horizontal heating flues therein, regenerators for supplying air and gas to the flues and adapted to receive waste heat therefrom, said regenerators arranged side by side and extending in a vertical direction at the same narrow side only of the oven chambers, vertical channels one end of which connect with one end of said regenerators, said vertical channels being arranged between said regenerators and the heating flues, a horizontal passage communicably connecting each heating flue of a heating wall with one of said vertical channels, and horizontal cross-channels connecting the heating flues of a wall with the flues of another wall, so as to connect the heating walls into a plurality of groups, in which the regenerators for supplying air and gas to the flues are equal in number to the regenerators receiving waste heat.

3. In a vertical chamber oven, the combination of a substantially horizontal series of alternate vertical narrow and broad sided oven chambers, and heating walls therefor, each of said heating walls having horizontal heating flues therein, regenerators for supplying air and gas to the heating flues and adapted to receive waste heat therefrom, said regenerators arranged side by side and extending in a vertical direction at the same narrow side only of the oven chambers, pairs of vertical channels, the members of each pair of which connect with one end of the gas and with one end of the air regenerators respectively, said channels being arranged between the regenerators and the heating flues, the horizontal heating flues of a heating wall being communicably connected with a pair of said vertical channels, and horizontal cross-channels connecting the other ends of a plurality of horizontal flues with similarly positioned heating flues of another heating wall, so as to connect the flues of said walls into separate heating systems.

4. In a vertical chamber oven, the combination of a substantially horizontal series of alternate vertical narrow and broad sided oven chambers, and heating walls therefor, each of said heating walls having horizontal heating flues therein, regenerators for supplying air and gas to the heating flues and adapted to receive waste heat therefrom, said regenerators arranged side by side and extending in a vertical direction at the same narrow side only of the oven chambers, a pair of vertical channels for each heating wall, the members of each pair of which connect with one end of a gas and with one end of an air regenerator respectively, said vertical channels being arranged between the regenerators and the heating flues, passages communicably connecting each horizontal flue of a heating wall to a pair of said channels, horizontal cross-channels connecting the other end of each horizontal flue of a heating wall with a similarly positioned flue of another heating wall, and a valve for each horizontal flue.

5. In a vertical chamber oven, the combination of a substantially horizontal series of alternate vertical narrow and broad sided oven chambers, and heating walls therefor, each of said heating walls having horizontal heating flues therein, pairs of regenerators for supplying air and gas to the heating flues and adapted to receive waste heat therefrom, said regenerators arranged side by side and extending in a vertical direction at the same narrow side only of the oven chambers, pairs of vertical channels, one end of the members of each pair of which connect with one end of a gas and with one end of an air regenerator respectively, passages communicably connecting each of the heating flues of a heating wall with a pair of said vertical channels, thus connecting the heating flues with the regenerators, and horizontal cross-channels for connecting the heating flues of a heating wall with the heating flues of a neighboring heating wall, so as to connect the heating walls into heating groups, the regenerators for supplying air and gas being equal in number to the regenerators for receiving waste heat.

6. In a vertical chamber oven, the combination of a vertical narrow and broad sided oven chamber, heating walls for said chamber, having heating flues therein, each of said heating flues having adjacent horizontal arms, regenerators for supplying air and gas to the flues and adapted to receive waste heat therefrom, said regenerators arranged side by side and extending in a vertical direction at the same narrow side only of the oven chambers, vertical channels connected to said regenerators at one end, passages arranged one above the other communicably connecting the heating flues of a heating wall with a pair of said vertical channels, thus connecting the heating flues with the regenerators, adjustable passages connecting adjacent arms of each of the heating flues in the same heating wall with each other, and a cross-channel at the top of the heating walls for connecting the flues from one wall to the other.

7. In a vertical chamber oven the combination of a substantially horizontal series of alternate vertical oven chambers, and heating walls therefor, having horizontal heating flues therein, a pair of regenerators for supplying air and gas to the heating flues of each heating wall and adapted to receive waste heat therefrom, said regenerators arranged side by side and extending in a vertical direction at the same narrow side of the oven only, vertical channels each communicably connected at its upper end with one of said regenerators, means for connecting one end of the heating flues of a heating wall with the heating flues of another heating wall, a plurality of horizontal passages in each heating wall, arranged one above the other, said passages communicably connecting the heating flues of a wall with a pair of said vertical channels, so as to provide groups of heating walls in which the flues of each wall are communicably connected to an equal number of regenerators.

In testimony whereof, I have signed my name to this specification.

CARL OTTO.